No. 848,018. PATENTED MAR. 26, 1907.
S. A. ENGELHARD.
MEAT BROILER.
APPLICATION FILED APR. 16, 1906.
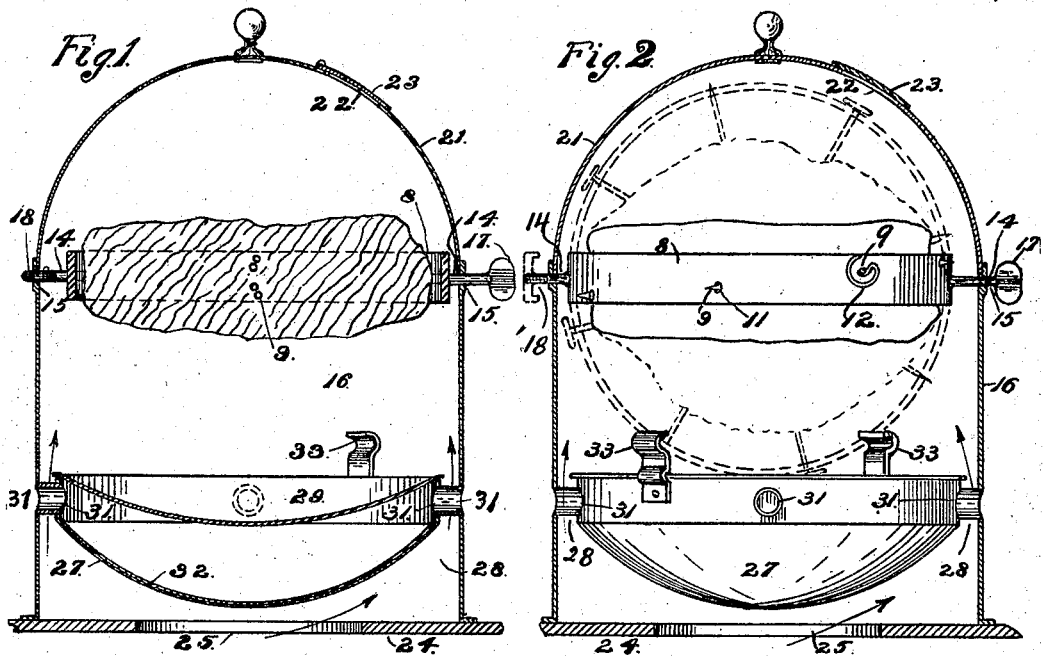
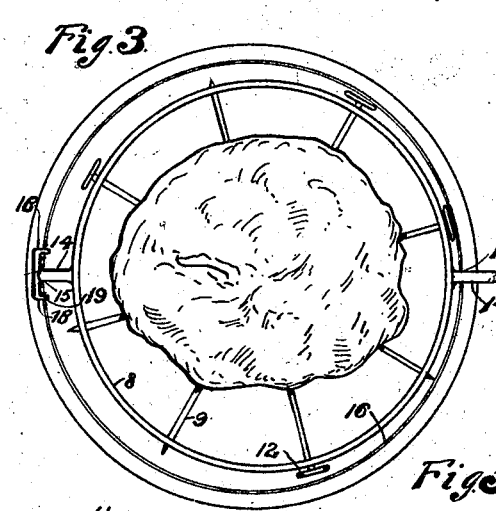
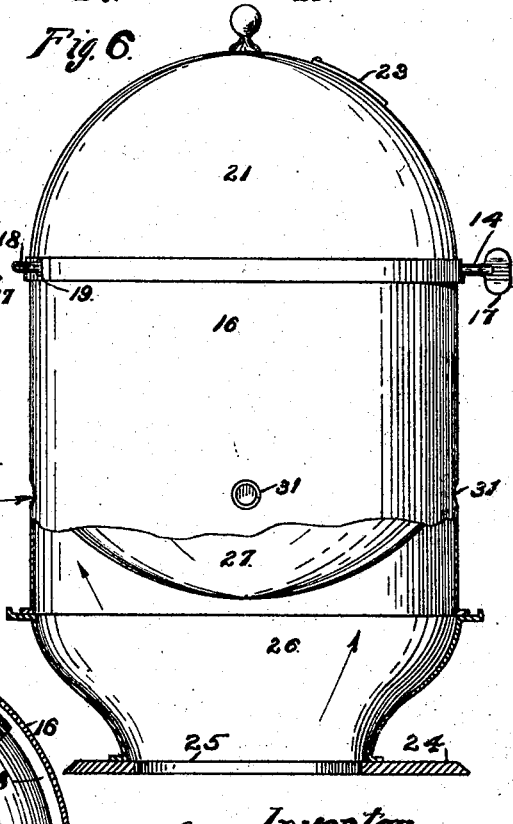
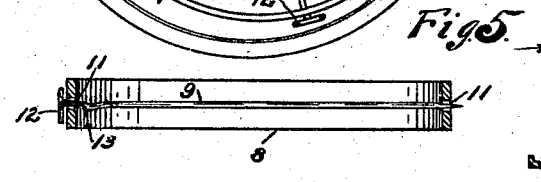
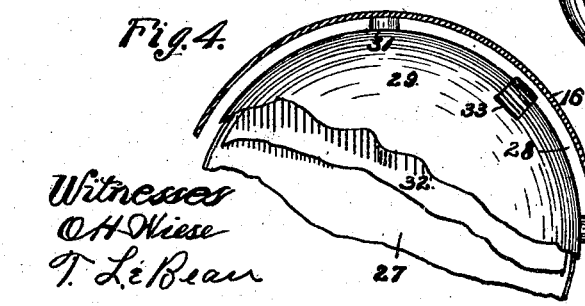
Witnesses
O. H. Wiese
T. LeBeau
Inventor
Stephan A. Engelhard
by C. Spengel atty
THE NORRIS PETERS CO., WASHINGTON, D. C.

UNITED STATES PATENT OFFICE.

STEPHAN A. ENGELHARD, OF COLUMBUS, OHIO.

MEAT-BROILER.

No. 848,018.  Specification of Letters Patent.  Patented March 26, 1907.

Application filed April 16, 1906. Serial No. 311,870.

*To all whom it may concern:*

Be it known that I, STEPHAN A. ENGELHARD, a citizen of the United States, and residing at Columbus, Franklin county, State of Ohio, have invented certain new and useful Improvements in Meat-Broilers; and I do declare the following to be a clear, full, and exact description of the invention, attention being called to the accompanying drawing, with the reference characters marked thereon, which form also a part of this specification.

This invention relates to improvements in meat-broilers, being a cooking utensil of the kind in which meats or other food products are cooked by direct exposure to the immediate action of heat from an open fire.

The invention consists of certain improvements in construction in general and in detail, all as more fully described hereinafter and pointed out in the claims and as illustrated in the accompanying drawing, in which—

Figure 1 shows my meat-broiler in a central vertical section. Fig. 2 is a similar view, the section, however, not extending to the internal parts. Fig. 3 is a top view of the broiler with its cover removed. Fig. 4 is a part of a horizontal section taken below this top view. Fig. 5 is an enlarged sectional detail view of the meat-holder, showing also one of the meat-holding pins in position. Fig. 6 is an elevation of the broiler with its lower part broken away and shown as resting on a supplementary base.

In the drawings 8 is a circular frame provided with means for supporting articles of food. These means might be a perforated box or wire basket in case these products should be potatoes, fruits, biscuits to be baked, or corn to be roasted; but since meat is more usually the article which is to be cooked these means consist of pins 9, which pierce the meat and at their ends occupy openings 11, located diametrically opposite each other in frame 8. These pins are of wire pointed at one end and curled at the other, as shown at 12, to form a handle thereat which facilitates manipulation, while a pin is placed in position on frame 8 with the meat within this latter. Near one end these pins are curved, as shown at 13 in Fig. 5, so as to be partly out of alinement with holes 11, which causes a pin when in position to fit tightly and to bind within its respective openings, being thereby prevented from sliding out of the frame, particularly when the same is turned for reversal of the meat, as shown in Fig. 2. The complementary holes for the pins are arranged at different planes, horizontally considered, to prevent interference of the pins where they pass each other in the center. (See Figs. 2 and 3.)

To permit turning of the frame to reverse the position of the meat, trunnion-journals 14 14 are provided on this frame diametrically opposite each other and fitted into bearings 15 15 on the upper edge of a cylindrical housing 16, which forms the inclosing body of the broiler. At one of these journals a handle 17 is provided, whereby the meat-support may be turned from time to time to expose opposite sides of the meat equally to the heat. To hold the meat-support in a normal horizontal position, locking means are provided as follows: The other journal carries stops 18, which may be an attachment or inwardly-directed parts of lateral extensions of said journal. These stops are fitted to occupy normally openings 19 in the side of housing 16. (See Figs. 1 and 3.) The size of frame 8 is somewhat less than the size of housing 16, (note Fig. 3,) and the length of journals 14 is such that this frame may be slid or shifted laterally in its bearings 15, as shown in Fig. 2. If it becomes now desirable to reverse the meat, the meat-supporting frame is partly shifted laterally to the left, as shown in Fig. 2, which causes stops 18 to become free, permitting thereafter the frame to be turned, as shown in dotted lines. After the frame has arrived again in a horizontal position it is relocked by being shifted in the opposite direction. These two journals serve furthermore as a means for taking hold of the meat-support when the same is to be lifted out of the housing. This latter is closed upwardly by a cover 21, resting on and fitted to its upper edge. An opening 22 is arranged in this cover provided with a swinging flap 23. This opening may serve for purposes of observation or venting. Heat produced in any suitable way and from fuel which does not give off smoke enters the broiler at its lower open end.

As shown in Figs. 1 and 2, the broiler rests upon what is presumed to be the top 24 of a stove and the heat from which passes through an opening 25 into the broiler above. As shown in Fig. 6, the broiler rests upon an intermediate base 26, fitted to receive at its upper edge the lower edge of the broiler, while its lower edge is fitted to meet the size of the stove-opening. The heat is prevented from beating directly against the meat by a deflector 27, supported horizontally in the lower part of the broiler, its manner of support being such that an annular space 28 is left, (see Fig. 4,) through which the heat passes upwardly. Juices, molten fat, and other drippings produced by action of the heat upon the meat are caught in a pan 29, supported above the deflector. Vapors produced from this matter by contact with this pan, which becomes quite hot, rise and surround the meat, to be at once absorbed thereby, so that this latter is practically cooked and barbecued by simmering in its own juices, which keep the same moist and tender. No loss of substance results, since the pan catches all drippings, and absorbable matter is returned to the meat. To prevent excessive heating of the pan, the same is supported with a space between it and deflector 27 below. A convenient manner of supporting it is by having it resting on the upper edge of this deflector. In addition, this space is also ventilated by flues 31, open to the outside. Being attached to the housing, these flues serve also as means for supporting the deflector. Asbestos lining 32 may also be provided above deflector 27 to reduce excessive action of heat against the under side of pan 29. Whenever necessary, this latter may be lifted out by taking hold of its handles 33, cover 21 and meat-support 8 having first been lifted off.

All parts of the broiler may be made of sheet metal with the exception of frame 8, which may be cast.

It is obvious that as to arrangement and function in general the construction is not necessarily dependent on or limited to a circular shape and might also be polygonal.

Having described my invention, I claim as new—

1. In a broiler, the combination of a housing, a cup-shaped deflector supported below the same in a manner to provide an annular space between its side and the housing for the passage of heat, a drip-pan supported on the upper edge of this deflector so as to leave a space between the two, lateral flues whereby this space communicates with the outside and a meat-support above the drip-pan.

2. In a broiler, the combination of a housing, a deflector provided with lateral flues connecting the same to the housing for support, a drip-pan resting on the deflector with a space between the two, which space is ventilated by the flues mentioned and a meat-support above this pan.

In testimony whereof I hereunto set my hand in presence of two witnesses.

STEPHAN A. ENGELHARD.

Witnesses:
 JOHN A. FRANZ,
 DWIGHT HARRISON.